United States Patent Office 3,360,439
Patented Dec. 26, 1967

3,360,439
PROCESS FOR PREPARING 1-DEHYDRO STEROIDS
Raymond C. Erickson, New Brunswick, William E. Brown, Princeton, and Richard W. Thoma, Somerville, N.J., assignors, by mesne assignments, to E. R. Squibb & Sons, Inc., New York, N.Y., a corporation of Delaware
No Drawing. Filed Aug. 19, 1964, Ser. No. 390,757
7 Claims. (Cl. 195—51)

ABSTRACT OF THE DISCLOSURE 1-dehydrogenation is effected by pretreating cells of a 1-dehydrogenating microorganism with at least five volumes of a lower alkanol or lower alkanone per volume of cells at a temperature no higher than about 5° C., and intermixing the thus-treated cells with the steroid in the presence of a hydrogen carrier.

This invention relates to a process for preparing steroids and, more particularly, to an improved process for the microbial 1-dehydrogenation of steroids.

With the discovery that the introduction of a double bond into the 1,2-position of hydrocortisone increased the glucocorticoid activity, attention was directed to processes for 1-dehydrogenation of steroids of the 3,20-diketo-$\Delta^4$-pregnene series. Subsequently other 1-dehydrogenated steroids were found to have commercial utility as glucocorticoid and anti-inflammatory drugs. Among such steroids can be mentioned triamcinolone and dexamethasone. It was also found that the desired 1-dehydrogenation could be accomplished either chemically or microbiologically. Chemical methods, such as by the use of selenium dioxide, however, suffered the disadvantage of giving a selenium containing by-product which was difficult to remove. Microbial methods, although superior, have hithertofor been accompanied by substantial reduction of the keto group in the 20-position to yield an undesired 20-hydroxy derivative. To minimize this reduction in the 20-position, certain inhibitors, such as iodoacetates have been suggested (see U.S. Patent No. 3,022,226).

It is an object of this invention, therefore, to provide an improved process for 1-dehydrogenating a steroid of the 3,20-diketo-$\Delta^4$-pregnene series.

It is another object of this invention to provide a process for 1-dehydrogenating a steroid of the 3,20-diketo-$\Delta^4$-pregnene series wherein the concomitant reduction of the 20-keto group to a 20-hydroxy group is minimized or eliminated.

These objects are achieved by the process of this invention which comprises subjecting under aerobic conditions a steroid of the 3,20-diketo-$\Delta^4$-pregnene series to the action of a 1-dehydrogenase enzyme system from which the 20-keto reductase enzyme has been eliminated. Elimination of the 20-keto reductase enzymatic activity is accomplished, in the practice of this invention, by subjecting fresh or frozen cells of a 1-dehydrogenating microorganism of a species, which naturally also contains a 20-keto reductase enzyme system, to treatment with a water-miscible or lower alkanol or lower alkanone, such as ethanol and acetone. Thus, in accordance with the process of this invention, fresh or frozen cells of a 1-dehydrogenating microorganism, collected from the medium in which it is grown by centrifugation or filtration, or, alternatively, a subcellular fraction, prepared by differential centrifugation, precipitation, or absorption of an active and inactive matter prepared by mechanical or enzymatic disintegration of cells, is solvent-treated with a lower alkanol or lower alkanone. This treatment may be effected by diluting one volume of an aqueous suspension of the cells, in the case where intact cells are used, or one volume of an equeous suspension or solution, in the case where a subcellular fraction is used, with about five to about 20 volumes of solvent.

The preferred volume ratio is about one part of aqueous phase to about 10 parts of solvent; the preferred mixing procedure being to add the aqueous suspension or solution to the solvent with constant and vigorous mixing, while maintaining the temperature in the range of about 0° to about 5° C. The cells or cell fraction is then collected from the solvent-water mixture by centrifugation or filtration, dried further by solvent washing, and the residual solvent is then removed in vacuo.

The mixture of 1-dehydrogenating and 20-keto reducing enzymes utilized in the process of this invention is preferably prepared in an initial step wherein a microorganism known to effect 1-dehydrogenation of steroids is grown in a suitable aqueous nutrient medium containing a substance which induces the formation of the desired 1-dehydrogenase enzyme. Suitable inducing substances include steroids saturated in the 1,2-position. Although any such steroid may be used, because of their low cost, testosterone and progesterone are particularly preferred for this purpose.

Suitable microorganisms include those known to effect 1-dehydrogenation of steroids as exemplified by members of the genera: Orthrobacter (e.g., *A. simplex*), Nocardia (e.g., *N. aurantia* and *N. asteroides*), Bacterium (e.g., *B. cyclooxydans*), Mycobacterium (e.g., *M. rhodochrous*), Bacillus (e.g., *B. sphaericus*), Septomyxa (e.g., *S. affinis*), Didymella (e.g., *D. lycopersici*), Calonectria (e.g., *C. decora*), Fusarium (e.g., *F. solani*), Cylindrocarpon (e.g., *C. radicicola*), Pseudomonas (e.g., *P. testosteroni*), Streptomyces (e.g., *S. lavendulae*), and also selected species of the genera Protaminobacter, Alcaligenes, Alternaria, Ophiobolus and Pycnodithis.

In general, the conditions of culturing the microorganisms for the purpose of preparing the 1-dehydrogenase and associated enzymes are the same as those of culturing microorganisms for the production of antibiotics or vitamins. Thus, the microorganism is grown in contact with (in or on) a suitable nutrient medium. If an aerobic microorganism is being grown, an adequate supply of oxygen (air) is provided during the growth period. A suitable nutrient medium essentially comprises a source of nitrogenous factors and an assimilable source of carbon and energy. The latter may be a carbohydrate, such as sucrose, molasses, glucose, maltose, starch or dextrin. The source of nitrogenous factors may be organic (e.g., soybean meal, corn steep liquor, meat extract, distillers solubles, peptones and/or yeast extract) or synthetic (i.e., composed of simple, synthesizable organic and inorganic compounds such as ammonium salts, alkali nitrates, amino acids or urea.

In order to induce the formation of the desired 1-dehydrogenase enzyme, a 1,2-saturated steroid, such as progesterone and testosterone, is also added to the nutrient medium. The steroid is present in sufficient quantity to favor optimum formation of the desired enzyme and preferably is present in a concentration of at least 0.01% (w./v.) of the nutrient medium.

After a suitable growth period (at least 24 hours), the cells are separated from the nutrient medium in the usual manner, such as by filtration or centrifugation, and the separated cells containing the desired 1-dehydrogenase are then treated with the alcohol or ketone as described hereinbefore. The thus treated cells are then mixed with the steroid to be 1-dehydrogenated, under aerobic conditions, preferably in a buffered aqueous menstruum containing a catalytic quantity of a hydrogen carrier, such as phenazine methosulfate or 2-methyl-1,4-naphthoquinone. An adequate supply of oxygen is assured by continuously aerating and/or agitating the reaction medium.

Although in the processes described in the examples following solvent-treated whole cells are employed, solvent-treated subcellular fractions may also be used. However, since the solvent treatment inactivates the 20-keto reductase system, the necessity for disintegration and subsequent fractionation of the cells is eliminated when a 1-dehydrogenating preparation is required and the only undesirable enzyme activity is the 20-keto reductase.

Among the steroids of the 3,20-diketo-$\Delta^4$-pregnene series which may be converted into useful 1-dehydro derivatives by the practice of this invention may be mentioned monohydroxyprogesterone (e.g., $11\alpha$ - hydroxyprogesterone, the $9\alpha$- and $12\alpha$-halo-$11\beta$-hydroxyprogesterones, desoxycorticosterone and 21 - fluoro - $17\alpha$ - hydroxyprogesterone); the dihydroxyprogesterones (e.g., cortiscosterone, the $9\alpha$- and $12\alpha$-halocorticosterones, Reichstein's Compound S, $11\beta$, $17\alpha$-dihydroxyprogesterone, cortisone, the $9\alpha$- and $12\alpha$-halocortisones, 21-fluoro-$11\beta$, $17\alpha$-dihydroxyprogesterone and $9\alpha$,21-difluoro-$11\beta$,$17\alpha$-dihydroxyprogesterone); the trihydroxyprogesterones (e.g., hydrocortisone, $\Delta^4$-pregnene-$11\alpha$,$17\alpha$,21-triol-3,20-dione, the $9\alpha$- and $12\alpha$-halohydrocortisones, and the 16-methyl-$9\alpha$-halohydrocortisones); and the tetrahydroxyprogesterones (e.g., $9\alpha$-fluoro-$16\alpha$-hydroxyhydrocortisone, 6-methyl-$9\alpha$-fluoro-$16\alpha$-hydroxyhydrocortisone and the 6,9-dihalo-$16\alpha$-hydroxyhydrocortisones); as well as the 21-ester derivatives of those steroids containing a 21-hydroxyl group (e.g., Compound S acetate, hydrocortisone acetate, $9\alpha$-fluorohydrocortisone acetate and $9\alpha$-fluorocortisone acetate). The preferred 21-esters are those of hydrocarbon carboxylic acids having less than ten carbon atoms as exemplified by the lower fatty acids (e.g., acetic and propionic acids), the monocyclic aryl carboxylic acids (e.g., benzoic and $\alpha$-toluic acids), the monocyclic aryl lower alkanoic acids (e.g., phenacetic and $\beta$-phenylpropionic acids), the cycloalkane carboxylic acids and the cycloalkene carboxylic acids.

The following examples are illustrative of the invention (all temperatures are in degrees centigrade):

EXAMPLE 1.—TRIAMCINOLONE

(a) Preparation of wet cells

A culture of *Arthrobacter simplex* ATCC 6946 is grown for seven days at 25° on an agar slant of the following composition:

| | G. |
|---|---|
| Beef extract | 1.5 |
| Yeast extract | 3.0 |
| Peptone | 6.0 |
| Glucose | 1.0 |
| Agar | 15.0 |

Distilled water, 1 liter.
Autoclaved 30 minutes at 121°.

Three ml. aliquots of a suspension obtained from washing off the surface growth of a slant with 10 ml. of the following medium (F1):

| | G. |
|---|---|
| $KH_2PO_4$ | 1.0 |
| Peptone | 10.0 |
| Yeast extract | 2.5 |
| Glucose | 30.0 |

Water, 1 liter.
pH 7.2 before autoclaving 30 minutes at 121°.

are used to inoculate 50 ml. portions of the same F1 medium contained in cotton-stoppered 250 ml. Erlenmeyer flasks. The flasks are incubated three days at 25° on a rotary shaker running at 280 c.p.m. with a 2 inch radius. The entire flask contents are then transferred aseptically to 4 liter Erlenmeyer flasks containing 1 liter of the F1 medium. Three flasks (the F2 flasks) are incubated two days at 25° on a reciprocating shaker running at 120 c.p.m. with a one and one-quarter inch stroke.

Six F2 flasks are used to inoculate 50 gallons of F1 medium in an aerated, agitated fermentation vessel. After 48 hours of cell growth, 15 g. of testosterone in 300 ml. of methanol are filter sterilized and added to the fermentation. Twenty-four hours later the cells are harvested by centrifugation and stored at $-17°$ or chilled to 5°.

(b) Preparation of acetone-dried cells

The concentrated cells obtained in step *a* (after thawing to 5° if previously frozen) are adjusted in volume (if necessary) with water at 5° to give a cell suspension that contains about 40% wet packed solids (volume basis) or 10% dry solids (weight basis). The resulting fluid cream (about 5 gallons) is mixed with 50 gallons of acetone at 5°, by diluting with cream into the acetone over a five minute period, while agitating vigorously. The temperature is maintained at 5° during and after mixing. The cells are collected immediately by filtration, washed on the filter with 5 gallons of acetone at 5°, air-dried until no acetone is apparent, and dried further at 5° over calcium chloride in a vacuum desiccator for eighteen hours. Thereafter, the dried preparation is transferred to an air-tight container and held at 5° until it is used.

(c) Dehydrogenation of steroid 1-dehydrogenation of $9\alpha$-fluoro-$16\alpha$-hydroxy-cortisol is accomplished in an aerated menstruum of the following composition at pH 7.0–7.2 and 30°:

| | | |
|---|---|---|
| Acetone-dried cells (wt./vol.) | percent | 0.5 |
| Methanol (vol./vol.) | do | 2.0 |
| $K_2HPO_4$ | mM | 50 |
| $Na_2H_2P_2O_7$ | mM | 50 |
| $Na_2B_4O_7$ | mM | 1.27 |
| 2-methyl-1,4-naphthoquinone | mM | 0.40 |
| $9\alpha$-fluoro-$16\alpha$-hydroxy-cortisol | mM | 9.6 |

Concentrated solutions of the phosphates are combined in a stainless steel vessel and adjusted in pH. The naphthoquinone, as an ethanolic concentrate (1.38 g./100 ml.) is added and a volume adjustment is made. A suspension of 250 g. of acetone-dried cells is made in about 2.5 liters of menstruum withdrawn, and the suspension is returned to the vessel. A concentrated solution of steroid-borate complex is made by dissolving 20 g. of $9\alpha$-fluoro-$16\alpha$-hydroxy-cortisol, with heating to about 80°, in one liter of methanol and 250 ml. of aqueous solution of borax (6.25 g./100 ml.). The steroid-borate concentrated solution is added to the cell suspension, and aeration and agitation are carried out for two to three hours. Thereafter, triamcinolone is recovered by conventional means.

EXAMPLE 2.—PREDNISOLONE

The procedure of Example 1 is followed, except that an equivalent amount of cortisol is substituted for the steroid and the steroid is added as an aqueous slurry of micronized material, thereby obviating the need for the borax and methanol. The reaction is complete in ten hours.

EXAMPLE 3.—1-DEHYDROPROGESTERONE

The procedure of Example 1 is followed, except that an equivalent amount of progesterone is substituted for the steroid and the steroid is added as a solution in N,N-dimethylformamide, thereby obviating the need for the borax and methanol. The medium contains 4.0% (vol./vol.) of dimethylformamide. The reaction is complete in ten hours.

Under the conditions of the foregoing examples, reduction of the 20-ketone group would ordinarily be expected to occur to some degree, if freshly prepared cells, or cells rehydrated from the lyophilized state, or thawed from the frozen state, were used. However, in the examples given and under conditions otherwise included in the scope of the invention, when solvent-dried cells are used, no evidence for reduction of the 20-keto group is seen, even when anaerobic conditions are employed so as to favor the 20-keto reductive processes.

The invention may be variously otherwise embodied within the scope of the appended claims.

What is claimed is:

1. In a process for selectively 1-dehydrogenating a 1,2-saturated steroid of the 3,20-diketo-$\Delta^4$-pregnene series, which process comprises the steps of subjecting the steroid to the action of the cells of a 1-dehydrogenating microorganism in the presence of a hydrogen carrier, and recovering the 1-dehydrogenated steroid formed, the improvement which comprises pretreating an aqueous suspension of such cells with from about five to about twenty volumes per volume of suspension of a solvent selected from the group consisting of lower alkanols and lower alkanones at a temperature of about 0° C. to about 5° C. for a time sufficient to inactivate the 20 keto reductase activity of the cells, and separating the treated cells from the solvent prior to contact with the steroid.

2. A process in accordance with claim 1 wherein the solvent is ethanol.

3. The process of claim 1, wherein the hydrogen carrier is present in catalytic amount.

4. The process of claim 1 wherein the solvent is acetone.

5. The process of claim 4 wherein the steroid is a borate complex of 9$\alpha$-fluoro-16$\alpha$-hydroxy-cortisol.

6. The process of claim 4 wherein the steroid is cortisol.

7. The process of claim 4 wherein the steroid is progesterone.

References Cited

UNITED STATES PATENTS

| | | |
|---|---|---|
| 2,776,927 | 1/1957 | Shull _____ 195—51 |
| 2,837,464 | 6/1958 | Nobile _____ 195—51 |
| 3,022,226 | 2/1962 | Ross _____ 195—51 |
| 3,037,915 | 6/1962 | Takeda et al. _____ 195—51 |
| 3,067,197 | 12/1962 | Agnello et al. _____ 195—51 X |
| 3,119,749 | 1/1964 | Thoma et al. _____ 195—51 |

ALVIN E. TANENHOLTZ, *Primary Examiner.*